(12) United States Patent
Sayer

(10) Patent No.: US 8,297,007 B2
(45) Date of Patent: Oct. 30, 2012

(54) TWO-PIECE FRAME ASSEMBLY FOR WINDOW OF ENCLOSURE

(75) Inventor: Douglas A. Sayer, Pocatello, ID (US)

(73) Assignee: Premier Technology, Inc., Pocatello, ID (US)

( * ) Notice: Subject to any disclaimer, the term of this patent is extended or adjusted under 35 U.S.C. 154(b) by 0 days.

(21) Appl. No.: 11/895,032

(22) Filed: Aug. 21, 2007

(65) Prior Publication Data

US 2008/0016799 A1    Jan. 24, 2008

Related U.S. Application Data

(62) Division of application No. 10/641,832, filed on Aug. 15, 2003, now Pat. No. 7,257,927.

(51) Int. Cl.
*E06B 3/988* (2006.01)
*E06B 7/00* (2006.01)

(52) U.S. Cl. ............... 52/171.1; 52/204.72; 52/204.597; 312/1; 976/DIG. 360

(58) Field of Classification Search .............. 52/171.1, 52/204.72, 204.71, 204.705, 204.597, 800.15, 52/800.16, 800.17; 296/90, 93, 96, 21; 244/129.3
See application file for complete search history.

(56) References Cited

U.S. PATENT DOCUMENTS

| | | | |
|---|---|---|---|
| 1,648,445 A | 11/1927 | Crowell | |
| 1,897,476 A | 2/1933 | Himmel et al. | |
| 2,219,461 A | 10/1940 | Williams | |
| 2,317,712 A | 4/1943 | Angelant | |
| 2,354,795 A | 8/1944 | Castle | |
| 3,028,938 A | 4/1962 | Schorr | |
| 3,088,627 A | 5/1963 | Saunders | |
| 3,155,461 A | 11/1964 | Hunt | |
| 3,410,619 A | 11/1968 | Delnay et al. | |
| 3,433,957 A | 3/1969 | Nelson | |
| 3,903,669 A | 9/1975 | Pease et al. | |
| 3,953,630 A | 4/1976 | Roberts et al. | |
| 3,969,857 A | 7/1976 | Stark | |
| 4,010,588 A | 3/1977 | Eisert | |
| 4,094,520 A | 6/1978 | Ng et al. | |
| 4,141,609 A | 2/1979 | Eisert | |
| 4,236,360 A | 12/1980 | Parrier et al. | |

(Continued)

FOREIGN PATENT DOCUMENTS

EP    0 515 953 A1    12/1992

(Continued)

OTHER PUBLICATIONS

French Preliminary Research Report from counterpart French Application No. 04 08863, dated Mar. 16, 2006, 2 pgs.

*Primary Examiner* — Michael Safavi
(74) *Attorney, Agent, or Firm* — TraskBritt

(57) ABSTRACT

Frames for mounting windows within the walls of enclosures for isolating or sealing substances such as radioactive or other hazardous substances from the surrounding environment. In a first embodiment of the present invention, a window assembly includes a two-piece frame that is welded into the wall of an enclosure. In a second embodiment of the present invention, a window assembly includes a three-piece frame that is clamped to the wall of an enclosure. The frame assemblies may also be used to mount structures other than windows to enclosure walls, such as ducts or pipes intended for passing power, gas, vacuum, or other utilities into the interior of an enclosure.

8 Claims, 12 Drawing Sheets

U.S. PATENT DOCUMENTS

| | | | |
|---|---|---|---|
| 4,251,123 A | 2/1981 | Brackenbush et al. |
| 4,259,818 A | 4/1981 | Stark |
| 4,418,506 A | 12/1983 | Weber et al. |
| 4,603,887 A | 8/1986 | Mayfield et al. |
| 4,612,743 A | 9/1986 | Salzer |
| 4,696,547 A | 9/1987 | Sims |
| 4,699,335 A | 10/1987 | DeOms et al. |
| 4,947,606 A | 8/1990 | LaSee |
| 5,069,010 A | 12/1991 | Trainor et al. |
| 5,090,782 A | 2/1992 | Glachet et al. |
| 5,363,420 A | 11/1994 | Polydor et al. |
| 5,419,626 A | 5/1995 | Crockett |
| 5,510,575 A | 4/1996 | Weibler |
| 5,577,355 A * | 11/1996 | Leonelli | 52/204.62 |
| 5,662,581 A | 9/1997 | Jennrich et al. |
| 5,711,120 A * | 1/1998 | Karpen | 52/212 |
| 5,765,325 A | 6/1998 | DeBlock |
| 5,887,959 A | 3/1999 | Yuri |
| 5,937,598 A | 8/1999 | Rain |
| 6,067,761 A | 5/2000 | Demeester |
| 6,105,320 A | 8/2000 | Boor et al. |
| 6,151,849 A | 11/2000 | Twigg et al. |
| 6,318,037 B1 | 11/2001 | Hansen |
| 6,359,742 B1 | 3/2002 | Canty et al. |
| 6,546,682 B1 | 4/2003 | DeBlock et al. |
| 6,647,677 B1 | 11/2003 | Berger, Jr. |
| 6,708,458 B1 | 3/2004 | Berger, Jr. |
| 6,905,094 B2 | 6/2005 | Dazet et al. |
| 7,257,927 B2 | 8/2007 | Sayer |
| 2003/0062450 A1 | 4/2003 | Dazet et al. |

FOREIGN PATENT DOCUMENTS

| | | |
|---|---|---|
| EP | 0 720 895 A1 | 7/1996 |
| GB | 991341 | 5/1965 |
| GB | 2 197 903 A | 6/1988 |

* cited by examiner

TWO-PIECE FRAME ASSEMBLY FOR WINDOW OF ENCLOSURE

CROSS-REFERENCE TO RELATED APPLICATION

This application is a divisional of U.S. patent application Ser. No. 10/641,832, filed Aug. 15, 2003, now U.S. Pat. No. 7,257,927, issued Aug. 21, 2007, the entire contents of which is hereby incorporated herein by this reference.

BACKGROUND OF THE INVENTION

1. Field of the Invention

The present invention relates to mounting structures to the walls of enclosures used for isolating or sealing substances within the enclosures from the surrounding environment. More particularly, the present invention relates to window assemblies for such enclosures that provide improved sealing capabilities and facilitate installation and removal of windows thereof.

2. State of the Art

It is often necessary to work with or handle hazardous substances that are associated with many of today's industrial processes. Waste items contaminated with radiation, for example, may require sorting into separate categories before being disposed of. The manufacture of medical products may also require risk-associated handling procedures, such as in making radiopharmaceuticals used in cancer treatments or working with biologically active compounds. When working with these substances, it is essential to isolate them from operating personnel to protect them from harmful exposure. To this end, enclosures are used that typically comprise rigid-walled containers having access portals for insertion, removal and manipulation of the hazardous substances, as well as windows to allow observation of conditions within the container. Enclosure sizes may range from room-sized containers intended for holding and processing large quantities of material, down to small containers called "glove boxes" that have glove ports sealed with gloves for individually handling small quantities of a substance.

To prevent the spread of contamination, the access portals and windows of an enclosure are sealed in a leak-tight fashion. This is especially important in situations where there is a pressure differential between the interior of the enclosure and the surrounding environment, as when substances must be processed in a vacuum or at low pressure. In the case of radioactive substances, it is also necessary to form or line the enclosure walls, access portal covers and windows with shielding that inhibits radiation from escaping from the enclosure. Such radiation-shielded enclosures, sometimes referred to as "hot cells," are commonly formed with walls and access portal covers comprising stainless steel lined with lead and windows impregnated with lead or other radiation-absorbing materials.

In response to the above-described structural requirements, various approaches have been developed for mounting and sealing windows within the walls of enclosures for containing hazardous substances. One widely used approach is a window assembly called a "zipper window." FIGS. 1A and 1B show a glove box 2 constructed with a zipper window assembly. As seen in FIG. 1A, glove box 2 includes top, bottom, and side walls 4 formed from a material such as plates of stainless steel. Stainless steel is desirable for forming walls 4 because it is resistant to corrosion or other reactive effects that may be associated with substances contained within glove box 2. Stainless steel also has a smooth surface finish that is easy to clean, which is important to prevent residual contaminants from building up within glove box 2. Glove ports 6 are provided for accessing the interior of glove box 2, and a window 8 is included to allow observation of interior conditions. Various sealed access ports (not shown) may also be included for inserting and removing substances or for passing power, gas and vacuum lines, or other utilities into the interior of glove box 2.

FIG. 1B is an enlarged sectional side view of a portion of the glove box in FIG. 1A taken along line -1B-1B showing the zipper window assembly for holding and sealing window 8 in place. A gasket 10 of elastomeric material seats window 8 in the window aperture of glove box wall 4. Gasket 10 includes a first U-shaped channel 12 that surrounds the edges of the aperture in wall 4 and an opposing, second U-shaped channel 14 that surrounds the edges of window 8. A wedge member 16 is inserted into a slot 18 in the side of gasket 10 to compress gasket 10 and seal the medial section of gasket 10 between channels 12 and 14 against the peripheries of wall 4 and window 8. A stainless steel frame 20 may also be attached over the interface between wall 4 and window 8 on the interior of glove box 2 in order to protect gasket 10 from corrosion or, in the event of fire, from combustion of substances within glove box 2. Frame 20 is typically attached by welding to the inside of wall 4.

Another approach to a window assembly structure used in the prior art with enclosures for containing hazardous substances involves bolting a window directly to the exterior of the enclosures. FIG. 2 shows a cross-sectional view of such a window assembly mounted to the wall 22 of an enclosure constructed as a hot cell. As with glove box 2, wall 22 is formed from plates of stainless steel. To prevent radiation from escaping from the hot cell, the outside of wall 22 may be lined with a layer of lead 24 or a similar radiation-absorbing material. A window 26 is provided that is also formed from radiation-absorbing materials, such as with one or more sheets of glass and/or clear polycarbonates impregnated with lead. Depending on the radioactivity of the substances contained within the hot cell enclosure, window 26 may have a thickness of a few inches or more to prevent the escape of radiation. Window 26 is positioned over the aperture in wall 22 and held in place by a flanged stainless steel frame 28 attached with bolts 30 welded directly to wall 22. As seen in FIG. 2, a U-shaped gasket 32 of elastomeric material surrounds the edges of window 26 to seal the interfaces with wall 22 and frame 28.

While the above-described window assembly designs have been used extensively, they have inherent structural shortcomings that raise concerns in the construction and sealing of enclosures. The structure of the zipper-type window assembly, for example, may encounter problems when sealing against high or low interior pressure conditions. In situations where the pressure differential between the interior of the enclosure and the surrounding environment is substantial, failure of the gasket in a zipper window assembly has even led to windows being blown entirely out of their window apertures. The window assembly wherein a window is bolted to the exterior of an enclosure also presents problems, especially when it is necessary to modify or replace a window. When an enclosure has been used to contain highly toxic or radioactive substances, material forming the enclosure walls may become contaminated to the point that it may not be cut, drilled, ground, or otherwise reworked. Therefore, bolts welded to the enclosure walls that have been stripped or damaged cannot be replaced. Likewise, if a thicker window is required to accommodate increased radiation levels within the enclosure, larger bolt holes may not be drilled in the walls to receive bolts capable of holding the higher window mass.

Another problem with these window assembly designs is that they provide little or no reinforcement for the junction between a window and an enclosure wall. As previously described, enclosure walls are commonly formed from plates of stainless steel. The thickness of this material may vary widely, with a ⅝ inch thick plate of stainless steel having a tolerance of ±⅛ inch, for example. The plates of stainless steel may also be warped or twisted, especially for walls of large-sized enclosures. With the prior art window assemblies, such irregularities around a window aperture may make it difficult to achieve proper sealing or may translate stress into the window itself. It has, therefore, been necessary to planarize the plates of stainless steel around window apertures by welding or grinding prior to attaching a window. These processes are time consuming and difficult to perform, and cannot be carried out on enclosure surfaces that have been contaminated by highly toxic or radioactive substances.

In view of the foregoing, a need exists for improved window assemblies that eliminate sealing problems and that simplify the installation, removal, and modification of enclosure windows.

BRIEF SUMMARY OF THE INVENTION

In accordance with the present invention, improved window assemblies are disclosed for use with enclosures intended to hold substances that must be isolated or sealed from the surrounding environment. A window assembly according to the present invention comprises a frame having a reinforcing rim mounted to the wall of an enclosure surrounding an aperture formed therein. A window is seated on a ledge inside the reinforced rim with a U-shaped gasket surrounding the perimeter of the window, with the legs of the U-shape extending over either side of the window and the base of the U-shape covering the edge of the window. An additional frame portion is fastened onto the outside of the reinforced rim to hold the window in place and seal the window assembly.

In a first embodiment of the present invention, the window assembly comprises a two-piece window frame configured for welding to the wall of the enclosure surrounding the aperture. An inner frame member has a flange-shaped cross section with a lip that abuts against the enclosure wall surrounding the window aperture. The inner frame member is welded to the enclosure wall, and a raised portion of the inner frame member projects outwardly to act as a reinforcing rim of the window assembly. A window surrounded by a U-shaped gasket is seated on a ledge running around the inside of the raised portion of the inner frame member. An outer frame member is fastened over the outside of the window with fasteners, such as by bolts or screws extending into the raised portion of the inner frame member. When tightened, the bolts compress the legs of the U-shaped gasket between the ledge of the inner frame member and the outer frame member to form a seal.

In a second embodiment of the present invention, the window assembly comprises a three-piece window frame configured for clamping to the wall of the enclosure surrounding the aperture. An inner frame member has a lip carrying a sealing element that abuts against the inside of the enclosure wall surrounding the window aperture. The inner frame member also has an interior ledge onto which a window surrounded by a U-shaped gasket is seated. An intermediate frame member has a lip carrying a sealing element that abuts against the outside of the enclosure wall surrounding the window aperture. The inner and intermediate frame members are bolted together to clamp them to opposite sides of the enclosure wall, with the intermediate frame member surrounding the perimeter of the window and acting as a reinforcing rim of the window assembly. An outer frame member is fastened over the outside of the window with fasteners, such as by bolts or screws passing through the intermediate frame member and into the inner frame member. As in the preceding embodiment, tightening the bolts compresses the U-shaped gasket between the ledge on the inner frame member and the outer frame member to form a seal.

Other and further features and advantages of the present invention will be apparent from the following descriptions of the various embodiments when read in conjunction with the accompanying drawings. It will be understood by one of ordinary skill in the art that the following embodiments are provided for illustrative and exemplary purposes only, and that numerous combinations of the elements of the various embodiments of the present invention are possible.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1A:
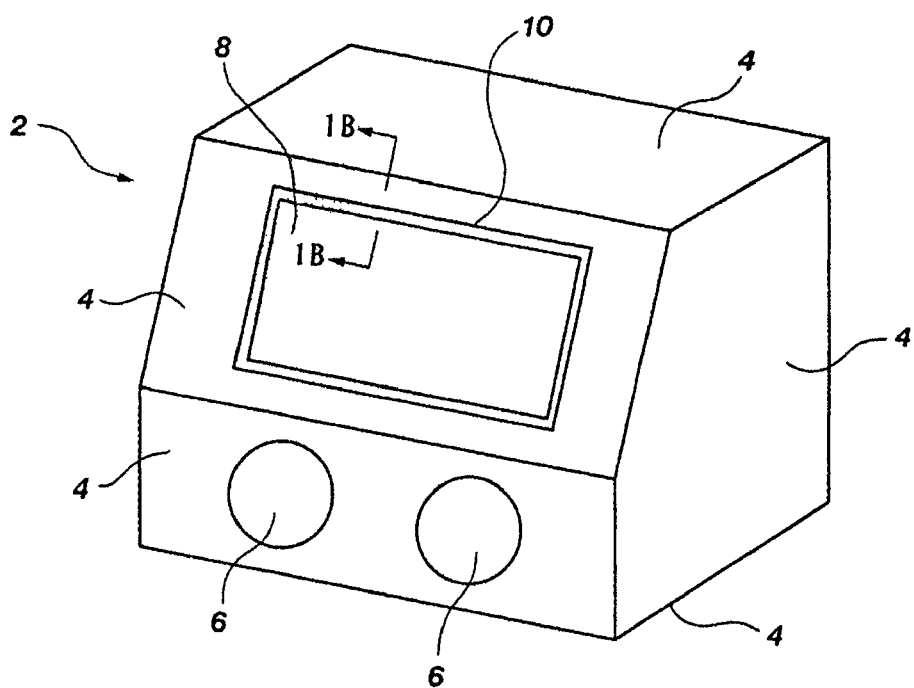
FIG. 1A is a perspective view of an exemplary prior art glove box.
Figure 1B:
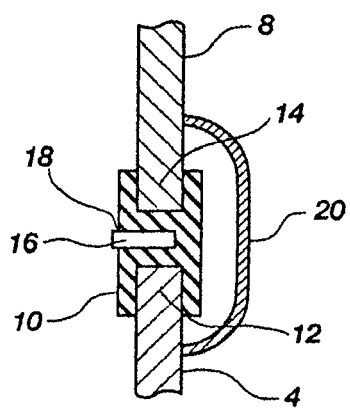
FIG. 1B is an enlarged sectional side view of a portion of a prior art zipper window assembly taken along line -1B-1B in FIG. 1A.
Figure 2:
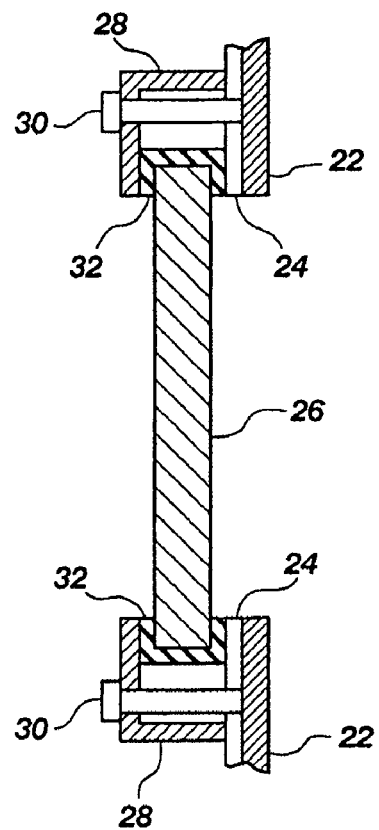
FIG. 2 is a sectional side view of a prior art window assembly bolted directly to the wall of an enclosure.

Referring in general to the accompanying drawings, various aspects of the present invention are illustrated to show exemplary window assemblies as well as methods for their construction. Common elements of the illustrated embodiments are designated with like reference numerals for clarity. It should be understood that the figures presented are not meant to be illustrative of actual views of any particular portion of a window assembly or the structure of an enclosure to which such a window assembly is attached, but are merely idealized schematic representations which are employed to more clearly and fully depict the invention.

Figure 3:
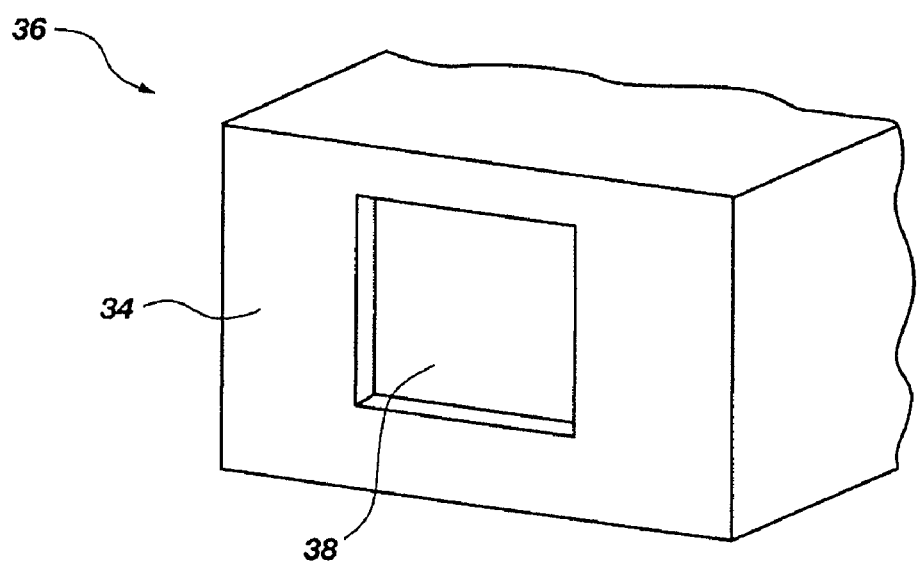
FIG. 3 is a perspective view of a wall of an enclosure.

As an example of a mounting location for a window assembly according to the present invention, FIG. 3 shows a perspective view of a wall 34 that forms the side of a sealed enclosure 36. Sealed enclosure 36 may comprise any structure intended for isolating substances from the outside environment, such as a glove box or even a room-sized container used for holding and processing large quantities of material. Wall 34 may be formed from a plate of stainless steel; however, any other materials used conventionally for forming the walls of such sealed enclosures are also contemplated as being within the scope of the present invention. Examples of other materials include, but are not limited to, other types of steel, aluminum, plastic, resin-based composite materials, or composite materials such as fiberglass. FIG. 3 shows that wall 34 includes an aperture 38 therethrough for receiving a window assembly to allow observation of interior conditions within the sealed enclosure.

Figure 4A:
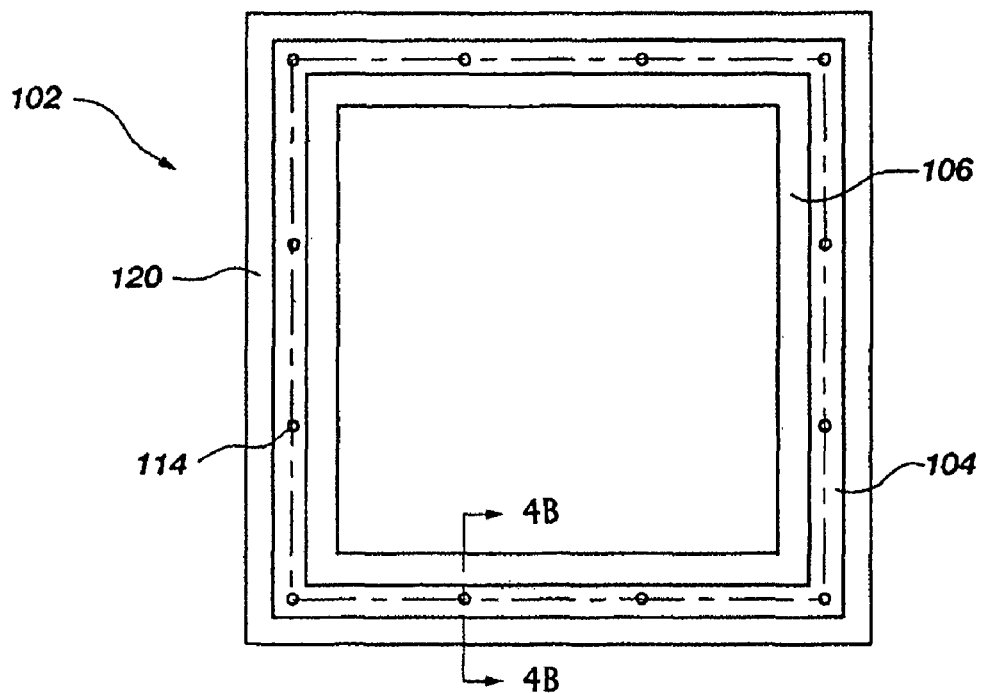
FIGS. 4A and 4B show an inner frame member according to a first embodiment of the present invention.
Figure 4B:
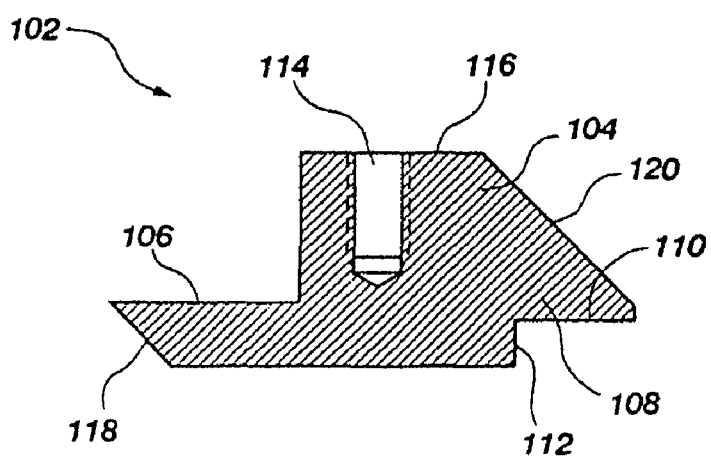
Figure 5A:
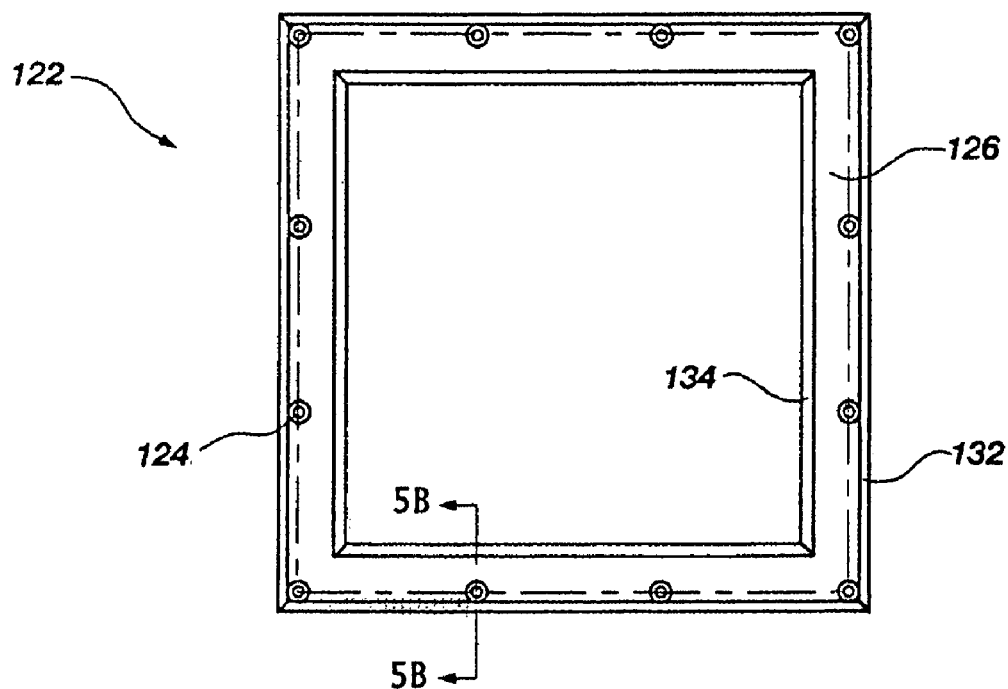
FIGS. 5A and 5B show an outer frame member according to the first embodiment of the present invention.
Figure 5B:
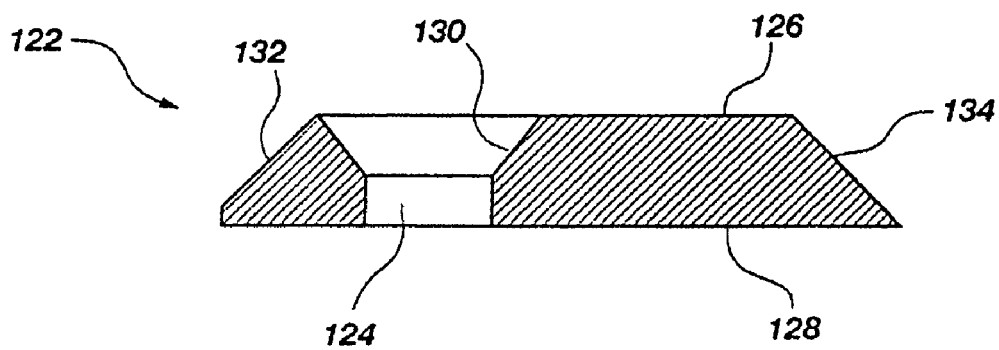
Figure 6:
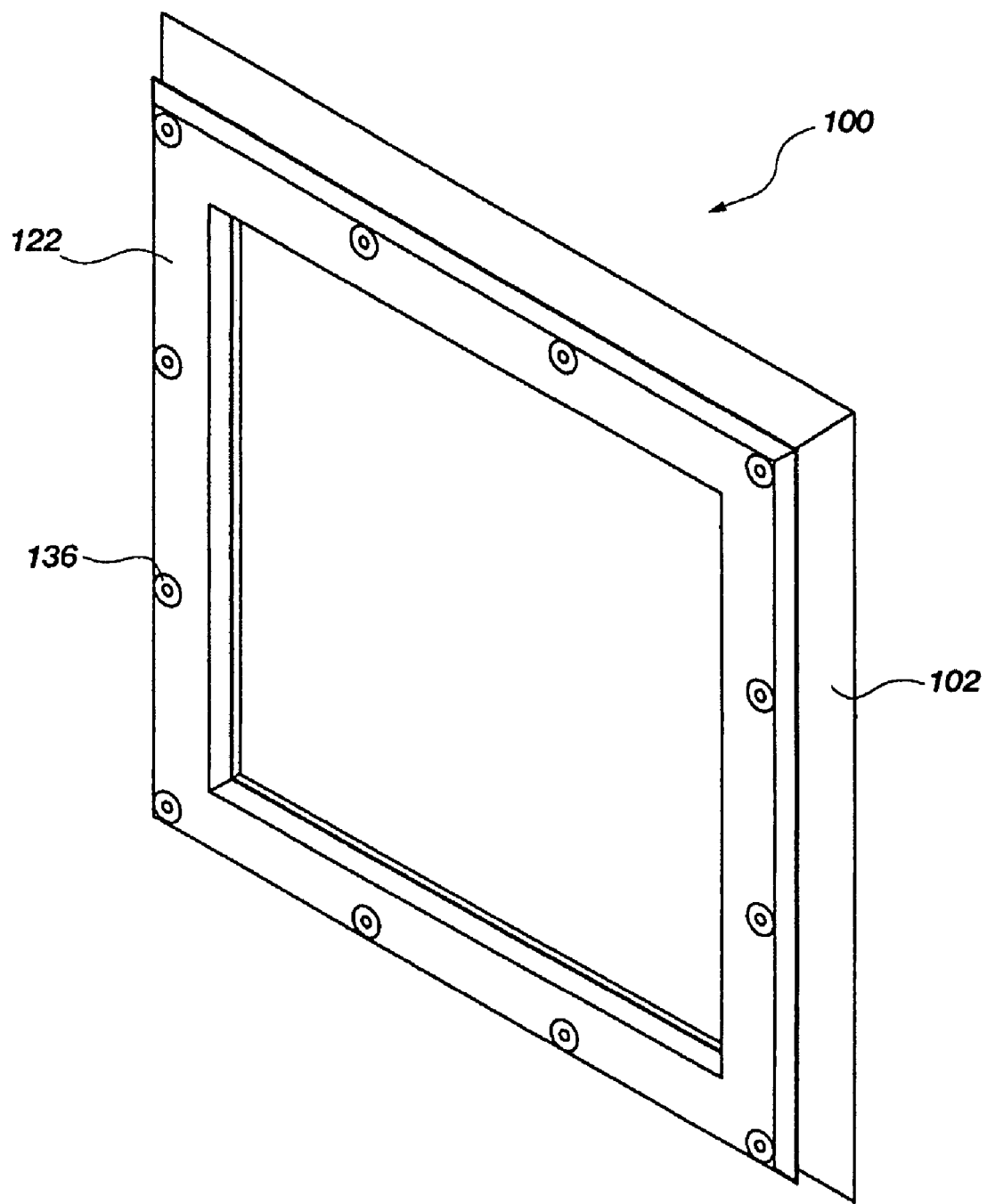
FIG. 6 is a perspective view of the frame members in FIGS. 4A-5B bolted together.

FIGS. 4A-7B illustrate a first embodiment of a window assembly according to the present invention comprising a two-piece window frame 100 (FIG. 6). As seen in FIGS. 4A and 4B, the first piece of window frame 100 comprises an inner frame member 102 that is configured to be welded into aperture 38 of wall 34 (FIG. 3). FIG. 4B, which is an enlarged cross section of inner frame member 102 taken along line -4B-4B in FIG. 4A, shows that inner frame member 102 has a flange shape with a raised portion 104 and a ledge 106 extending transversely thereto that runs around the inside periphery of raised portion 104. Inner frame member 102 also includes a lip 108 formed around the outside peripheral edge of raised portion 104. Lip 108 includes a first surface 110 configured to abut against the outside of wall 34, and a second surface 112 configured to lie within the inside periphery of window aperture 38. Threaded bolt holes 114 are formed in, but not through, a mounting surface 116 of raised portion 104. FIG. 4B shows that in order to prevent the buildup of residual contaminants on the interior surfaces of sealed enclosure 36, the inside peripheral edge of ledge 106 may be formed with a beveled surface 118. This reduces the possibility that substances will collect at the interface of ledge 106 and the interior surface of a window, and further facilitates cleaning. The outside edge of raised portion 104 may also include a beveled surface 120 to eliminate sharp corners on mounting surface 116.

As shown in FIGS. 5A and 5B, the second piece of window frame 100 comprises an outer frame member 122 that is configured to be fastened over the outside of a window seated in inner frame member 102. Outer frame member 122 includes bolt holes 124 that are spaced for alignment with threaded bolt holes 114 in inner frame member 102. FIG. 5B, which is an enlarged cross section of outer frame member 122 taken along line -5B-5B in FIG. 5A, shows that bolt holes 124 extend through outer frame member 122 from a top surface 126 to a clamping surface 128. Bolt holes 124 may include countersink portions 130, such that the heads of bolts inserted therein may be flush with top surface 126. Outer frame member 122 may also include beveled surfaces 132 and 134 to eliminate sharp corners on top surface 126. FIG. 6 is a perspective view of window frame 100, showing how outer frame member 122 is affixed to inner frame member 102 with bolts 136.

Figure 7A:
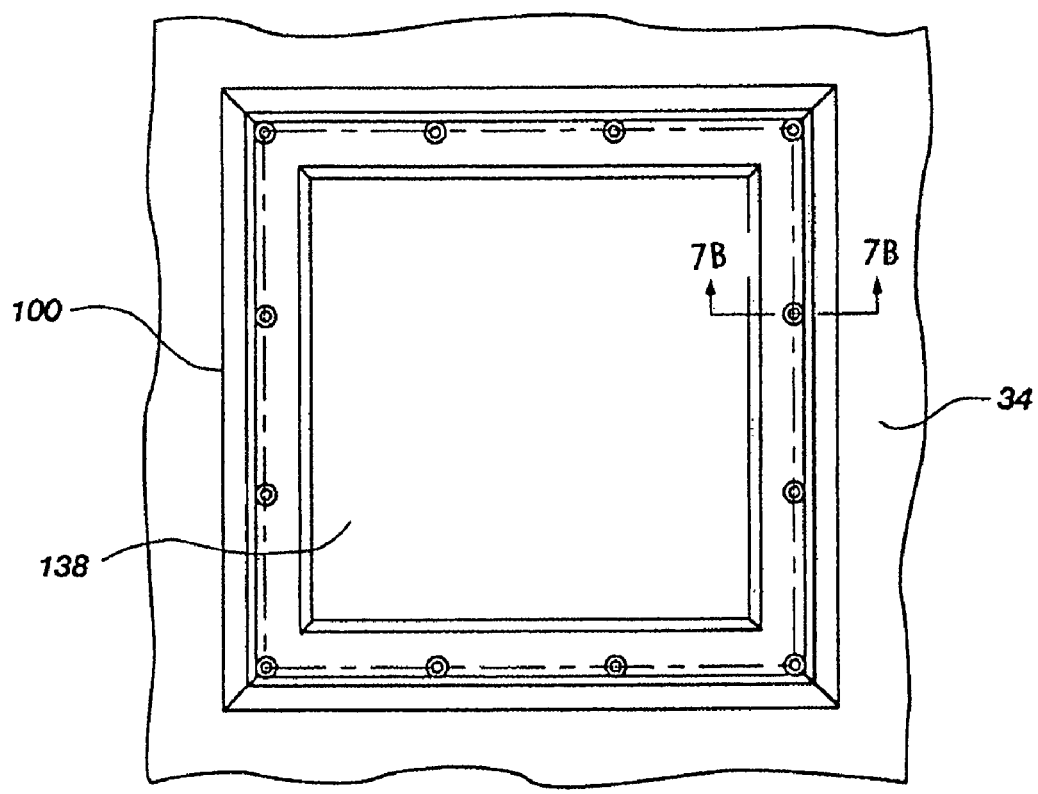
FIGS. 7A and 7B show a completed window assembly according to the first embodiment of the present invention.
Figure 7B:
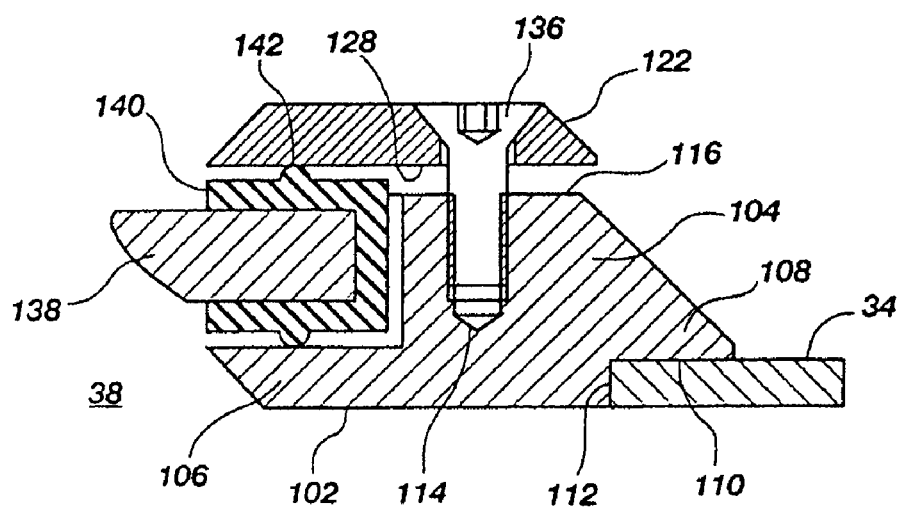

FIG. 7A is a front, exterior view of a completed window assembly according to the first embodiment of the present invention, wherein window frame 100 is mounted to enclosure wall 34 with a window 138 covering aperture 38. FIG. 7B is an enlarged cross section of the window assembly taken along line -7B-7B in FIG. 7A. Inner frame member 102 is sealed to wall 34 by welding along the interface between second surface 112 of lip 108 and the inside of window aperture 38. For additional strength and sealing, inner frame member 102 may also be welded along the interface between first surface 110 of lip 108 and the outside of wall 34. FIG. 7B shows the raised portion 104 of inner frame member 102 projects outwardly from wall 34, while ledge 106 extends perpendicularly across aperture 38. A U-shaped gasket 140 of an elastomeric material is placed around the periphery of window 138. The legs of U-shaped gasket 140 overlap peripheral inner and outer portions of window 138 and may include one or more ridges 142 for providing sealing beads to be compressed between the inner and outer frame members 102, 122 and window 138. Window 138 is seated on ledge 106 around the inside of raised portion 104 and outer frame member 122 is fastened to mounting surface 116 of raised portion 104 of inner frame member 102 with bolts 136 driven into threaded bolt holes 114. The clamping surface 128 of outer frame member 122 thus compresses down on the legs of U-shaped gasket 140 with window 138 disposed therebetween to form a leak-tight seal around window 138. As shown in FIG. 7B, the base of U-shaped gasket 140 is slightly spaced from the inner wall of raised portion 104 of inner frame member 102 to accommodate temperature fluctuations and expansion of materials.

According to the foregoing description, the first embodiment of the present invention provides a window assembly that overcomes the problems associated with previous window assembly designs for sealed enclosures. Securing window 138 between ledge 106 of inner frame member 102 and clamping surface 128 of outer frame member 122 eliminates the possibility that a pressure differential will cause window 138 to be blown out due to a gasket failure. Forming inner frame member 102 with raised portion 104 also provides window frame 100 with a substantially planar reinforcing rim having a uniform thickness. This eliminates the difficulty with sealing window 138 directly against surfaces of wall 34, which may exhibit warping, twisting, or variations in thickness, and reduces stress concentrations that may otherwise be induced in window 138. Furthermore, because threaded bolt holes 114 are formed in raised portion 104, they are spaced outwardly from the interior of sealed enclosure 36 and may be repaired or modified without having to rework contaminated wall materials.

Figure 8A:
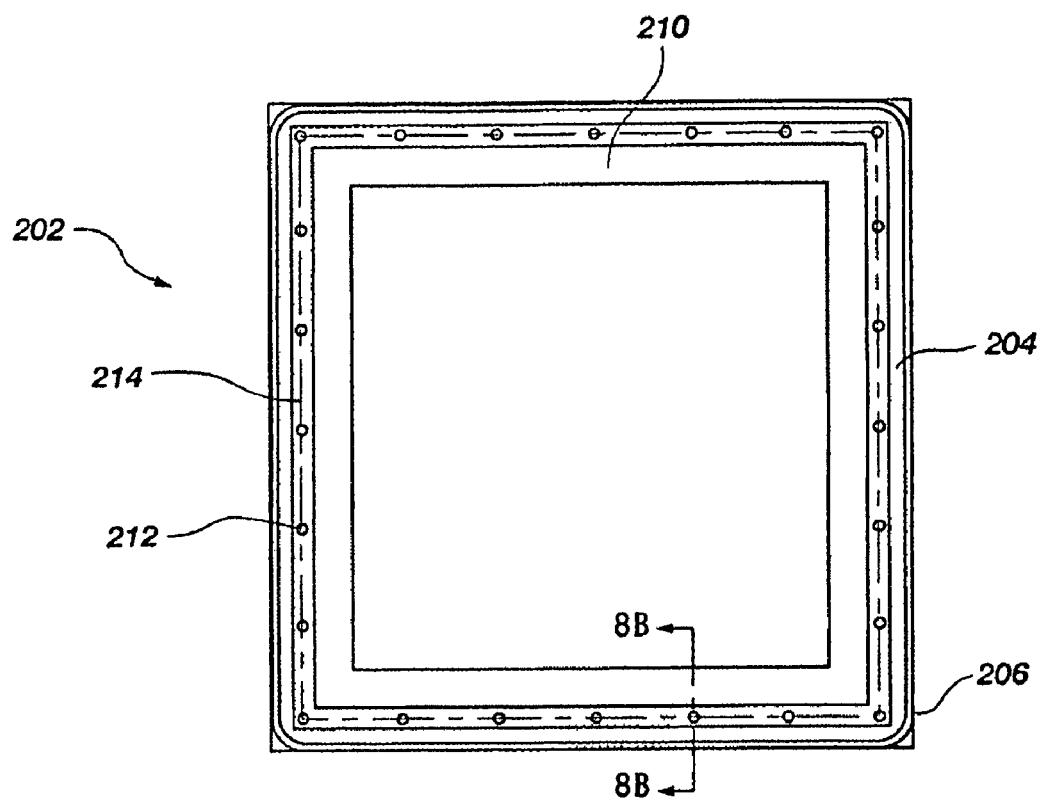
FIGS. 8A and 8B show an inner frame member according to a second embodiment of the present invention.
Figure 8B:
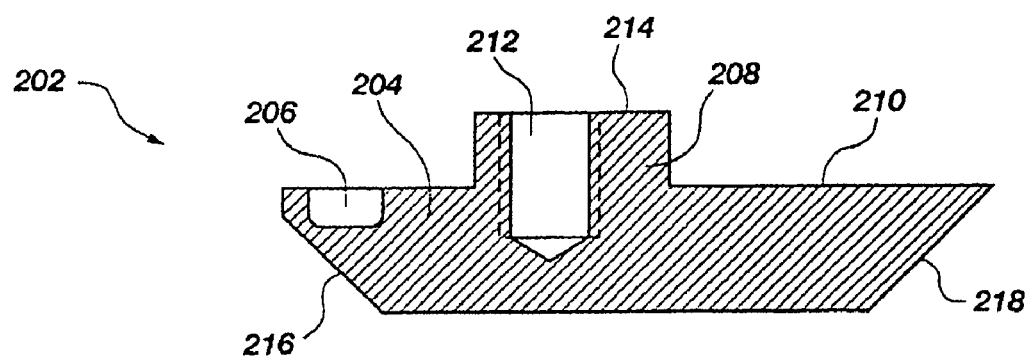
Figure 10A:
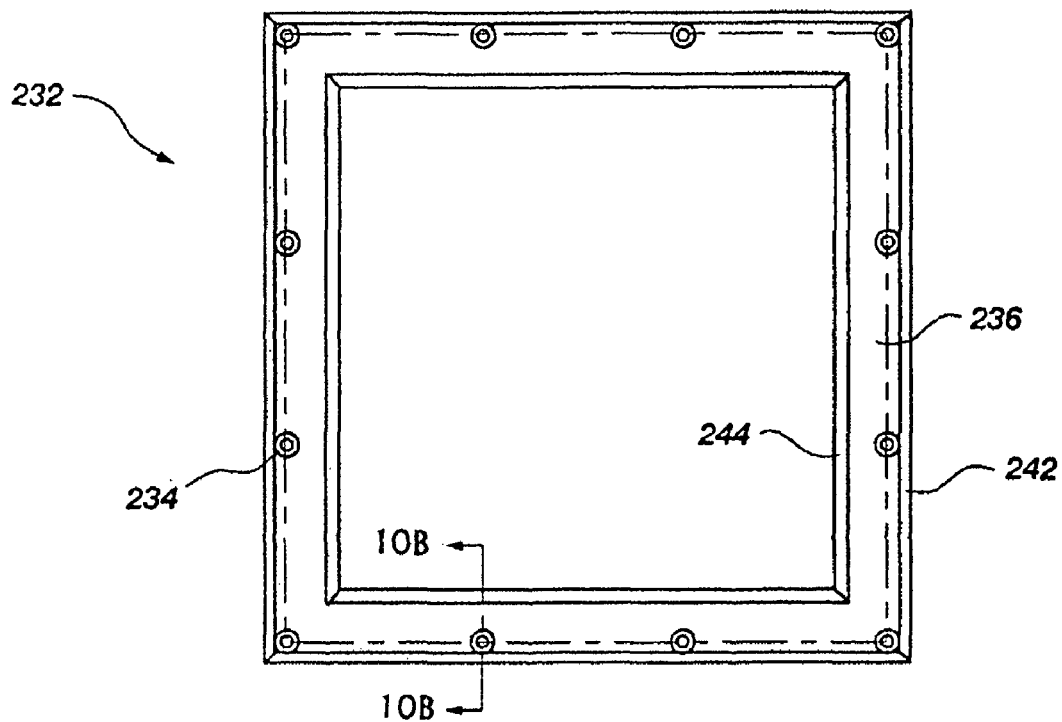
FIGS. 10A and 10B show an outer frame member according to the second embodiment of the present invention.
Figure 10B:
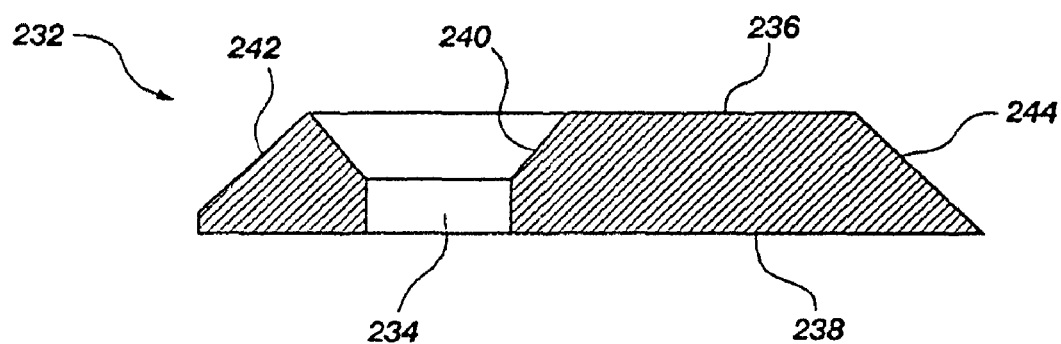
Figure 11:
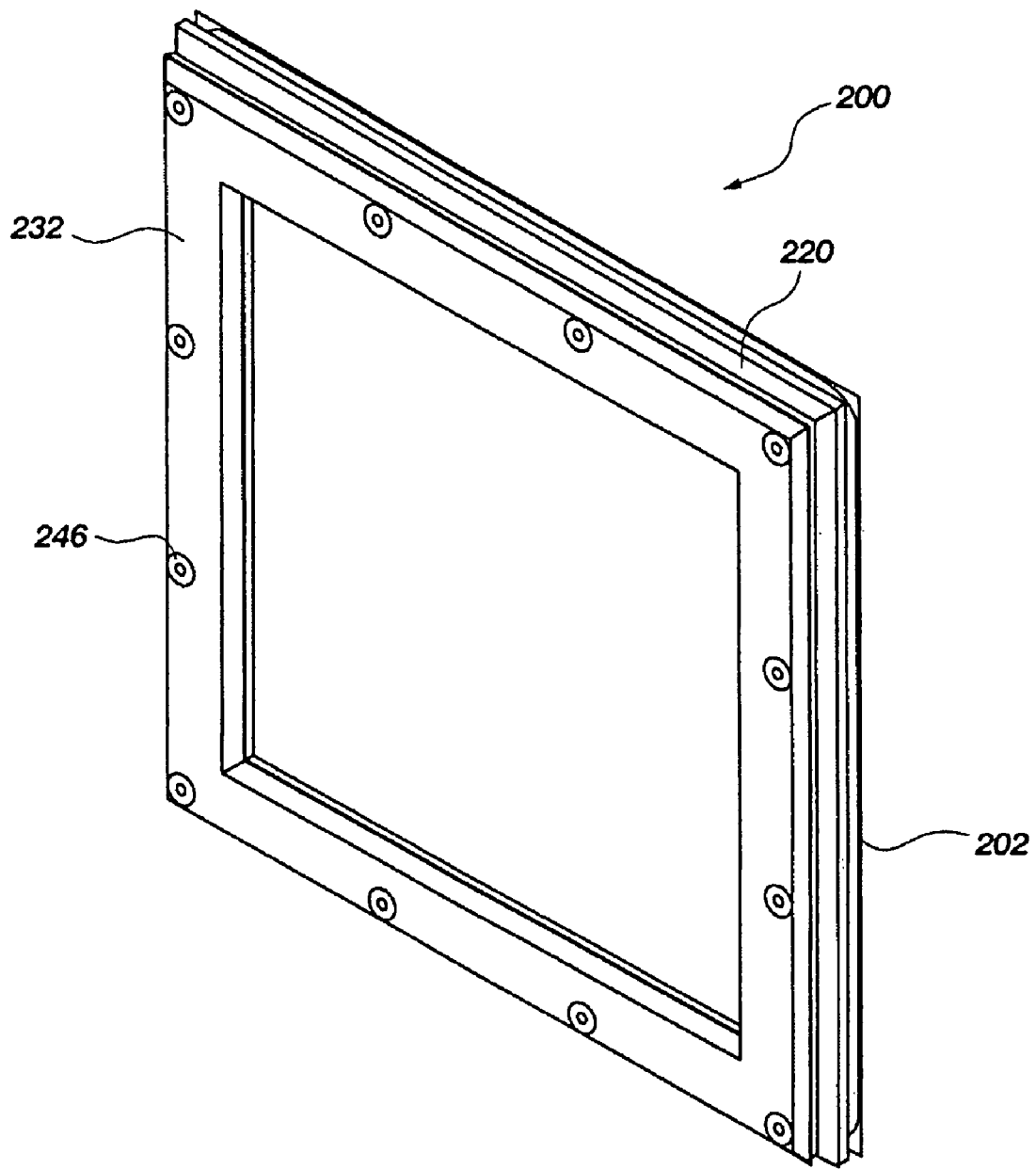
FIG. 11 is a perspective view of the frame members in FIGS. 8A-10B bolted together.

FIGS. 8A-13 illustrate a second embodiment of a window assembly according to the present invention comprising a three-piece window frame 200 (FIG. 11). As seen in FIGS. 8A and 8B, the first piece of window frame 200 comprises an inner frame member 202 that is configured to be attached to the inside of wall 34 around aperture 38 (FIG. 3). FIG. 8B, which is an enlarged cross section of inner frame member 202 taken along line -8B-8B in FIG. 8A, shows that inner frame member 202 has an outer peripheral lip 204 for abutting against the inside of wall 34 around aperture 38. Lip 204 includes a channel 206 for receiving a sealing element (not shown) to seal the interface between lip 204 and the inside of wall 34. Inner frame member 202 also has a raised portion 208 and a ledge 210 that runs around the inside periphery of raised portion 208. Threaded bolt holes 212 are formed in a mounting surface 214 of raised portion 208. FIG. 8B shows that inner frame member 202 may also include beveled surfaces 216 and 218 in order to prevent the buildup of residual contaminants on the interior surfaces of sealed enclosure 36.

Figure 9A:
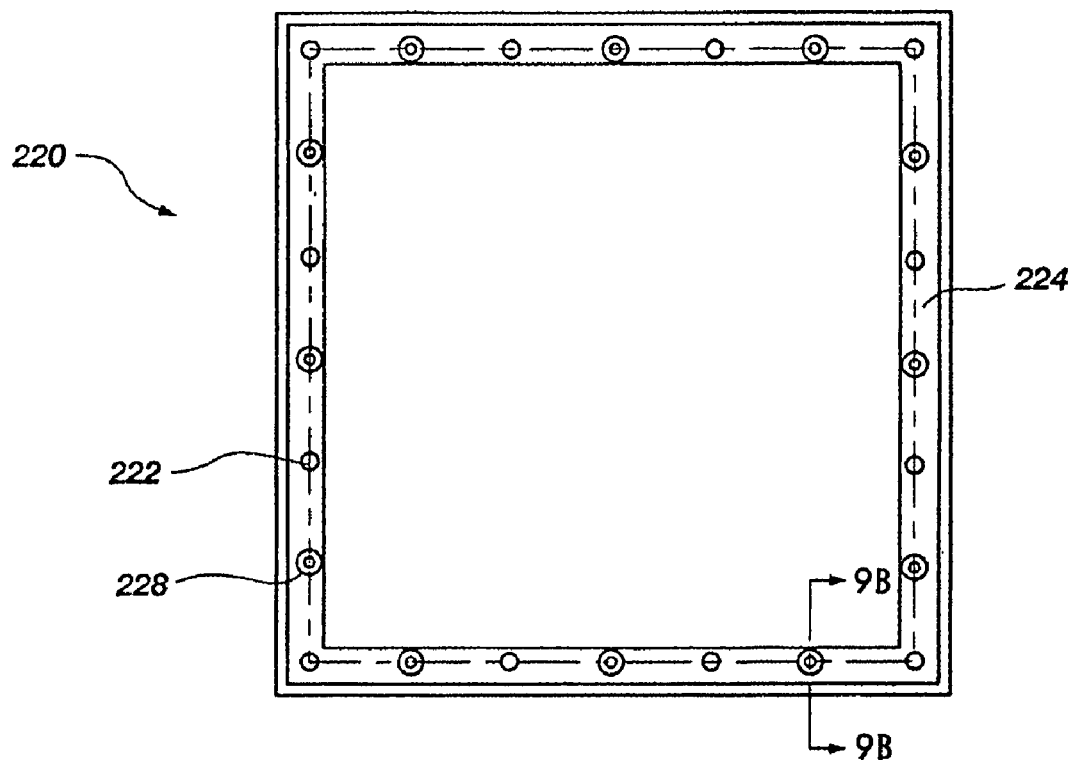
FIGS. 9A and 9B show an intermediate frame member according to the second embodiment of the present invention.
Figure 9B:
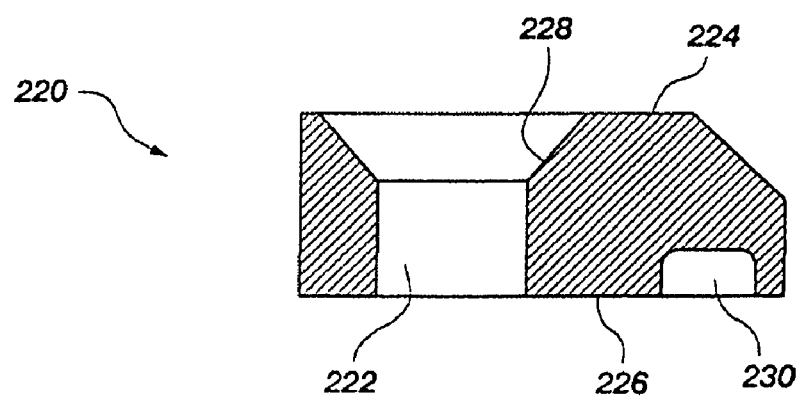

As shown in FIGS. 9A and 9B, the second piece of window frame 200 comprises an intermediate frame member 220 that is configured to be attached to the outside of wall 34 around aperture 38 (FIG. 3). Intermediate frame member 220 includes bolt holes 222 that are spaced for alignment with threaded bolt holes 212 in inner frame member 202. FIG. 9B, which is an enlarged cross section of intermediate frame member 220 taken along line -9B-9B in FIG. 9A, shows that bolt holes 222 extend through intermediate frame member 220 from a mounting surface 224 to a clamping surface 226 for abutting against the outside of wall 34 around aperture 38. Bolt holes 222 may include countersink portions 228, such that the heads of bolts inserted therein may be flush with mounting surface 224. As seen in FIG. 9A, only every other bolt hole 222 is provided with a countersink portion 228. This is because the remaining bolt holes 222 are intended to receive bolts which also pass through an outer frame member 232 (FIGS. 10A and 10B). The clamping surface 226 of intermediate frame member 220 includes a channel 230 for receiving a sealing element (not shown) to seal the interface between clamping surface 226 and the outside of wall 34.

FIGS. 10A and 10B show that the third piece of window frame 200 comprises an outer frame member 232 that is configured to be fastened over the outside of a window seated in inner frame member 202 and intermediate frame member 220. Outer frame member 232 includes bolt holes 234 that are spaced for alignment with threaded bolt holes 212 in inner frame member 202. FIG. 10B, which is an enlarged cross section of outer frame member 232 taken along line -10B-10B in FIG. 10A, shows that bolt holes 234 extend through outer frame member 232 from a top surface 236 to a clamping surface 238. Bolt holes 234 may include countersink portions 240, such that the heads of bolts inserted therein may be flush with top surface 236. Outer frame member 232 may also include beveled surfaces 242 and 244 to eliminate sharp corners on top surface 236. FIG. 11 is a perspective view of window frame 200, showing how outer frame member 232, intermediate frame member 220, and inner frame member 202 are held together with bolts 246.

Figure 12A:
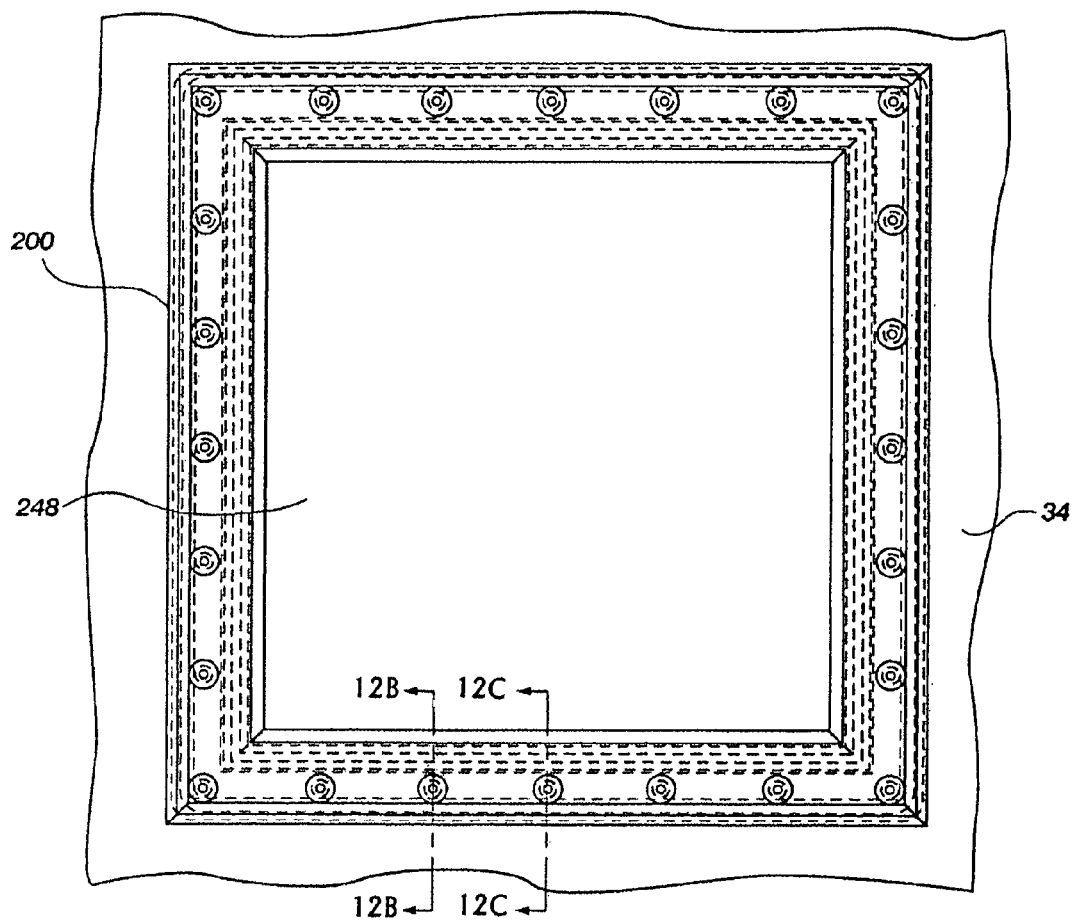
FIGS. 12A-12C show a completed window assembly according to the first embodiment of the present invention.
Figure 12B:
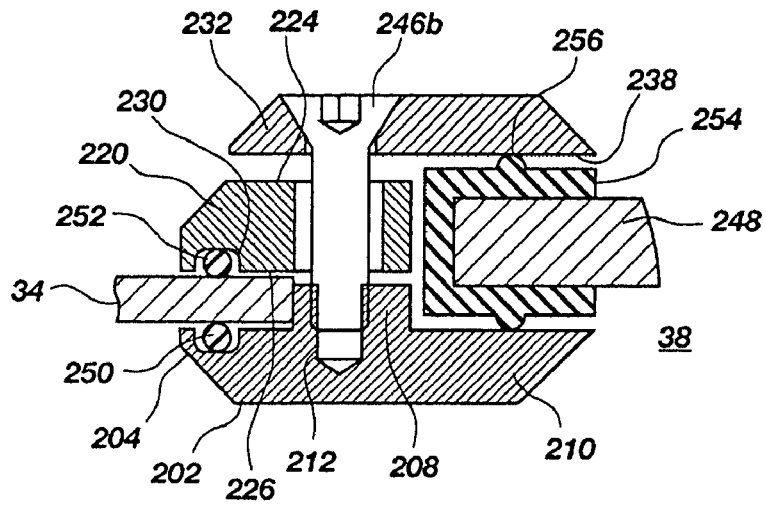
Figure 12C:
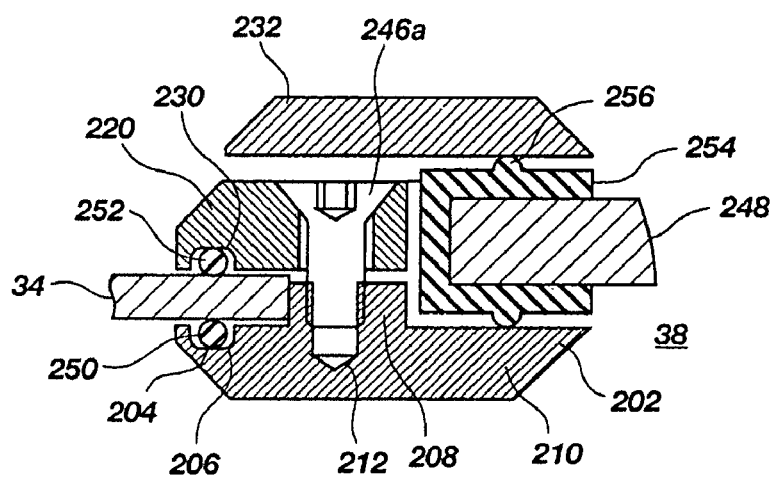
Figure 13:
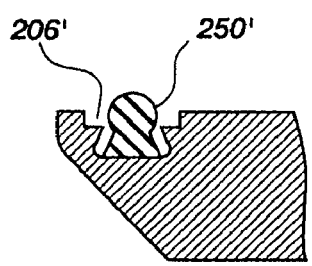
FIG. 13 shows an alternative embodiment of a gasket with a keyhole shape.

FIG. 12A is a front, exterior view of a completed window assembly according to the second embodiment of the present invention, wherein window frame 200 is mounted to enclosure wall 34 with a window 248 covering aperture 38. FIG. 12B is an enlarged cross section of the window assembly taken along line -12B-12B in FIG. 12A, and FIG. 12C is an enlarged cross section of the window assembly taken along line -12C-12C in FIG. 12A. Inner frame member 202 is placed within the interior of sealed enclosure 36 with lip 204 abutting against the inside of wall 34 around aperture 38. A sealing element 250 of, for example, elastomeric material is seated in channel 206 of lip 204 to seal the interface between lip 204 and the inside of wall 34. FIGS. 12B and 12C show that raised portion 208 of inner frame member 202 projects outwardly into aperture 38, while ledge 210 extends perpendicularly thereto across aperture 38. Intermediate frame member 220 is placed on the exterior of sealed enclosure 36 with clamping surface 226 abutting against the outside of wall 34 around aperture 38. Another sealing element 252 is seated in channel 230 of clamping surface 226 to seal the interface between clamping surface 226 and the outside of wall 34. While sealing elements 250 and 252 are depicted as O-ring type gaskets, other sealing element shapes may be used. For example, FIG. 13 shows a sealing element 250' having a keyhole-shaped cross section held in place by a channel 206' having inwardly canted sides. This arrangement reduces the chance that gasket 250' may become unseated from channel 206' and provides additional sealing surfaces. Returning to FIG. 12C, inner frame member 202 and intermediate frame member 220 are bolted together with wall 34 clamped therebetween and bolts 246a driven into threaded bolt holes 212. Bolts 246a are only inserted into bolt holes 222 having countersink portions 228 (FIG. 9B), such that the heads of bolts 246a are flush with mounting surface 224, and the remainder of bolt holes 222 remain free to receive bolts 246b that pass through outer frame member 232.

A U-shaped gasket 254 of an elastomeric material is placed around the periphery of window 248. The legs of U-shaped gasket 254 overlap peripheral inner and outer portions of window 248 and may include one or more ridges 256 for providing additional sealing beads to be compressed between inner and outer frame members 202, 232. Window 248 is seated on ledge 210 around the inside periphery of raised portion 208 with intermediate frame member 220 surrounding the perimeter of window 248. Outer frame member 232 is fastened to mounting surface 224 of intermediate frame member 220 with bolts 246b driven into threaded bolt holes 212. Thus, the clamping surface 238 of outer frame member 232 and ledge 210 of inner frame member 202 press down on the legs of U-shaped gasket 254 with window 248 therebetween to form a leak-tight seal around window 248.

As with the first embodiment of the present invention, the second embodiment of the present invention provides a window assembly that overcomes the problems associated with previous window assembly designs for sealed enclosures. Securing window 248 between ledge 210 of inner frame member 202 and clamping surface 238 of outer frame member 232 eliminates the possibility that a pressure differential will cause window 248 to be blown out due to a gasket failure. Intermediate frame member 220 also provides window frame 200 with a substantially planar reinforcing rim having a uniform thickness. As previously discussed, this eliminates the difficulty with sealing window 248 directly against surfaces of wall 34 and reduces stress concentrations that may damage window 248. Furthermore, because window frame 200 is clamped to the surfaces of wall 34, it may be installed and removed without having to rework contaminated wall materials. In situations where an enclosure has reached the end of its product life or must be decommissioned, this clamped arrangement also enables window frame 200 to be salvaged for use in another enclosure. The three-piece construction of window frame 200 also enables it to be easily modified. For example, if a different window thickness is required to accommodate radiation levels within a hot cell-type enclosure, intermediate frame member 220 may be replaced with an intermediate frame member of a different thickness.

To fabricate the window assemblies of the first and second embodiments of the present invention, frame members 102, 122, 202, 220, and 232 may be formed, for example, of stainless steel by machining or a high-density casting process. This provides highly planar frame members of uniform thickness that exhibit the corrosion resistance and ease of cleaning previously described above. The frame members may also be formed of other materials, including, but not limited to, other types of steel or aluminum, plastic, or composite materials such as fiberglass. Of course, the types of materials that may be used for forming the frame members will depend, in part, on the substances and environmental conditions within a sealed enclosure to which they are attached and, at least in the case of the first embodiment, whether or not they may be welded. Gaskets 140, and 254, and sealing elements 250 and 252 may be formed of any resilient material that has suitable sealing properties and is resistant to deterioration by the surrounding environmental conditions. An example of a commonly used gasket and sealing material is EPDM (ethylene propylene diene monomer).

While the above embodiments have been described in terms of mounting windows to the walls of sealed enclosures, it is also within the scope of the present invention to use frames 100 and 200 for mounting and sealing other structures to a wall. For example, frames 100 and 200 could be mounted around an access portal intended for inserting or removing substances or to provide a service panel, and windows 138 and 248 could be replaced with a plate of material such as stainless steel, steel, plastic, or a resin based composite material to cover and seal the access portal when not in use. Suitably configured frames 100 and 200 could also be used to mount and seal ducts or pipes to access portals intended for passing power, gas, vacuum, or other utilities into the interior of an enclosure. A flanged rim at the end of, or disposed about the exterior of the duct or pipe would simply be covered by a U-shaped gasket and secured between the frame members of frames 100 and 200 in the same manner as the edges of windows 138 and 248.

Each of the above-illustrated embodiments and variations thereof of the present invention provides improved mounting and sealing of windows or other structures to the walls of enclosures intended to hold substances that must be isolated or sealed from the surrounding environment. Although the present invention has been depicted and described with respect to the illustrated embodiments, various additions, deletions and modifications are contemplated within its scope. For example, while frames 100 and 200 have been illustrated as being configured with perimeter outlines for mounting to a generally square aperture 38, frames 100 and 200 could be also be formed with perimeter outlines for mounting to apertures having circular, oval, or any other shape. Furthermore, while the lip surfaces, ledge surfaces, and clamping surfaces of the various frame members have been depicted as being configured for interfacing with planar wall and window surfaces, other surface contours are possible. With hot cell-type enclosures, for example, the lip, ledge and clamping surfaces may have a stepped contour from the outer to inner periphery thereof in order to interface with similarly stepped window and wall surfaces formed to prevent radiation leakage through seams. The scope of the invention is, therefore, indicated by the appended claims rather than the foregoing description. All changes which come within the meaning and range of equivalency of the claims are to be embraced within their scope.

What is claimed is:

1. A system comprising:
    an enclosure having a non-glass wall, the non-glass wall having an interior surface facing the inside of the enclosure and an exterior surface located on the outside of the enclosure, and having a plurality of aperture surfaces extending from the interior surface to the exterior surface of the non-glass wall and defining an aperture through the non-glass wall;
    a first frame member affixed to the plurality of aperture surfaces, the first frame member having a ledge surrounding the aperture, a raised portion extending perpendicular to and surrounding the ledge, and extending over at least a portion of the exterior surface of the non-glass wall;
    a lip formed in the first frame member around an outer edge of the raised portion, the lip having a first surface abutting an exterior surface of the non-glass wall and a second surface lying within an inside periphery of the aperture passing through the non-glass wall;
    a plurality of threaded holes formed in a mounting surface on the raised portion of the first frame member;
    a second frame member located outwardly from the exterior surface of the non-glass wall and having a clamping surface surrounding the aperture, wherein the clamping surface of the second frame member lies substantially parallel to the ledge of the first frame member; and
    a plurality of holes extending through the second frame member, wherein the plurality of holes is spaced for alignment with the plurality of threaded holes in the first frame member and the second frame member is fastened to the mounting surface of the first frame member with a plurality of threaded fasteners.

2. The system of claim 1, wherein the first frame member is welded to the non-glass wall along an interface between the second surface of the lip in the first frame member and the plurality of aperture surfaces to form a sealed enclosure, and further comprising:
    a plate having peripheral inner and outer portions surrounded by legs of a U-shaped gasket disposed about the plate, wherein the plate is seated on the ledge of the first frame member, and wherein the clamping surface of the second frame member compresses the legs of the U-shaped gasket between the first and second frame members.

3. The system of claim 2, wherein the sealed enclosure comprises a glove box or a hot cell.

4. The system of claim 2, wherein the plate comprises a window.

5. The system of claim 4, wherein the window is impregnated with a radiation-absorbing material.

6. The system of claim 2, wherein the non-glass wall comprises a material from the group consisting of steel, stainless steel, aluminum, plastic, and fiberglass.

7. The system of claim 1, wherein the first frame member and the second frame member comprise a stainless steel.

8. A system comprising:
    an enclosure having a non-glass wall, the non-glass wall having an interior surface facing the inside of the enclosure and an exterior surface located on the outside of the enclosure, and having a plurality of aperture surfaces extending from the interior surface to the exterior surface of the non-glass wall and defining an aperture through the non-glass wall;
    a first frame member affixed to the plurality of aperture surfaces, the first frame member having a ledge surrounding the aperture, a raised portion extending perpendicular to and surrounding the ledge, and extending over at least a portion of the exterior surface of the non-glass wall;
    a lip formed in the first frame member around an outer edge of the raised portion, the lip having a first surface abutting an exterior surface of the non-glass wall and a second surface lying within an inside periphery of the aperture passing through the non-glass wall;
    a plurality of fastener-receiving holes formed in a mounting surface on the raised portion of the first frame member;
    a second frame member located outwardly from the exterior surface of the non-glass wall and having a clamping surface surrounding the aperture, wherein the clamping surface of the second frame member lies substantially parallel to the ledge of the first frame member; and
    a plurality of holes extending through the second frame member, wherein the plurality of holes is spaced for alignment with the plurality of fastener-receiving holes in the first frame member.

\* \* \* \* \*